(12) United States Patent
Chiu

(10) Patent No.: US 7,391,012 B2
(45) Date of Patent: Jun. 24, 2008

(54) APPARATUS FOR DETECTING ROTATIONAL ANGLE OF ROTATIONAL ELEMENT AND DETECTING METHOD THEREOF

(75) Inventor: Wen-Ssu Chiu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 31 days.

(21) Appl. No.: 11/400,897

(22) Filed: Apr. 10, 2006

(65) Prior Publication Data

US 2007/0145253 A1 Jun. 28, 2007

(30) Foreign Application Priority Data

Dec. 16, 2005 (CN) .................. 2005 1 0120685

(51) Int. Cl.
*G01D 5/34* (2006.01)
(52) U.S. Cl. .................. 250/231.18; 250/231.17; 341/13; 341/31
(58) Field of Classification Search ..................
250/231.13–231.18, 237 R, 237 G; 356/616–619; 341/11, 13, 31; 359/436–442
See application file for complete search history.

(56) References Cited

U.S. PATENT DOCUMENTS

| 4,825,070 | A  | * | 4/1989  | Arimura     | 250/231.18 |
| 2004/0206894 | A1 | * | 10/2004 | Oka et al.  | 250/231.13 |
| 2004/0227065 | A1 | * | 11/2004 | Thorburn    | 250/231.13 |
| 2005/0072912 | A1 | * | 4/2005  | Mizuno et al. | 250/231.14 |

FOREIGN PATENT DOCUMENTS

JP 61-1129528 * 6/1986

* cited by examiner

*Primary Examiner*—Davienne Monbleau
*Assistant Examiner*—Francis M Legasse, Jr.
(74) *Attorney, Agent, or Firm*—Jeffrey T. Knapp

(57) ABSTRACT

An apparatus (100) for detecting rotational angle of a rotational element (110), includes a light emitting element (1) and an image detecting element (3). The light emitting element is disposed on the rotational element to emit light. The image detecting element has a plurality of reception zones (31, 32 . . . N) for receiving the light emitted. Each of the reception zones corresponds to an angular section of the rotational element.

18 Claims, 4 Drawing Sheets

APPARATUS FOR DETECTING ROTATIONAL ANGLE OF ROTATIONAL ELEMENT AND DETECTING METHOD THEREOF

BACKGROUND OF THE INVENTION

1. Field of the Invention

The present invention generally relates to a detecting apparatus and, more particularly, to an apparatus for detecting rotational angle or position of a rotational and/or cylindrical element and a detecting method thereof.

2. Discussion of the Related Art

In the process of manufacturing cylindrical products, apparatuses for detecting rotational angle are generally used to detect the rotational angle or position of the cylindrical products so that cylindrical products can be effectively manufactured to a required shape. One such apparatus for detecting rotational angle typically includes a signal emitter disposed on the cylindrical product, a signal receiver disposed on a stage facing the signal emitter and perpendicular to an axis of the cylindrical product, and a display. To detect the rotational angle of the cylindrical product, the signal emitter transmits an electrical signal from the cylindrical product to the signal receiver, this signal is then converted into a visible readout such as a graph or a number that can be identified by a user. By reading the graph or number displayed on the display, the user can know the rotational angle of the cylindrical product.

It can be seen that, the electrical signal of the rotational angle of the cylindrical product has to be converted into a visible readout on a display before it can be identified by the user, therefore, the signal receiver needs to be connected with a decoding translator to convert the electrical signal into the visible readout. The decoding translator generally includes complex circuitry, thus, the decoding translator increases the complexity of the apparatus for detecting rotational angle. In addition, the electrical signal experiences a time-lapse. Therefore, the apparatus for detecting rotational angle cannot achieve high accuracy and efficiency.

What is needed, therefore, is an apparatus for detecting rotational angle which is simple, and can achieve high accuracy efficiency.

SUMMARY OF THE INVENTION

In one preferred embodiment, an apparatus for detecting a rotational angle of a rotational element, includes a light emitting element and an image-detecting element. The light emitting element is disposed on the rotational element to emit lights. The image detecting element has a plurality of reception zones for receiving the lights emitted. Each of the reception zones is labeled with one respective zone number. Each reception zone corresponds to one respective rotational angle of the rotational element as the rotational element rotates. The rotational angle of the rotational element can be detected by verifying the respective zone number of the corresponding reception zone.

Other advantages and novel features of preferred embodiments of the present apparatus for detecting rotational angle and its applications will become more apparent from the following detailed description when taken in conjunction with the accompanying drawings.

BRIEF DESCRIPTION OF THE DRAWINGS

Many aspects of apparatus for detecting rotational angle of a rotational element and their applications can be better understood with reference to the following drawings. The components in the drawings are not necessarily drawn to scale, the emphasis instead being placed upon clearly illustrating the principles of apparatus for detecting rotational angle. Moreover, in the drawings, like reference numerals designate corresponding parts throughout the several views.

Referring to FIG. 1, in a first embodiment, the apparatus 100 for detecting a rotational angle of a rotational element 110 such as a cylindrical product includes a light emitting element 1 and an image detecting element 3. The rotational element 110 includes a circumferential surface 1101 and an end surface 1102.

Figure 4:
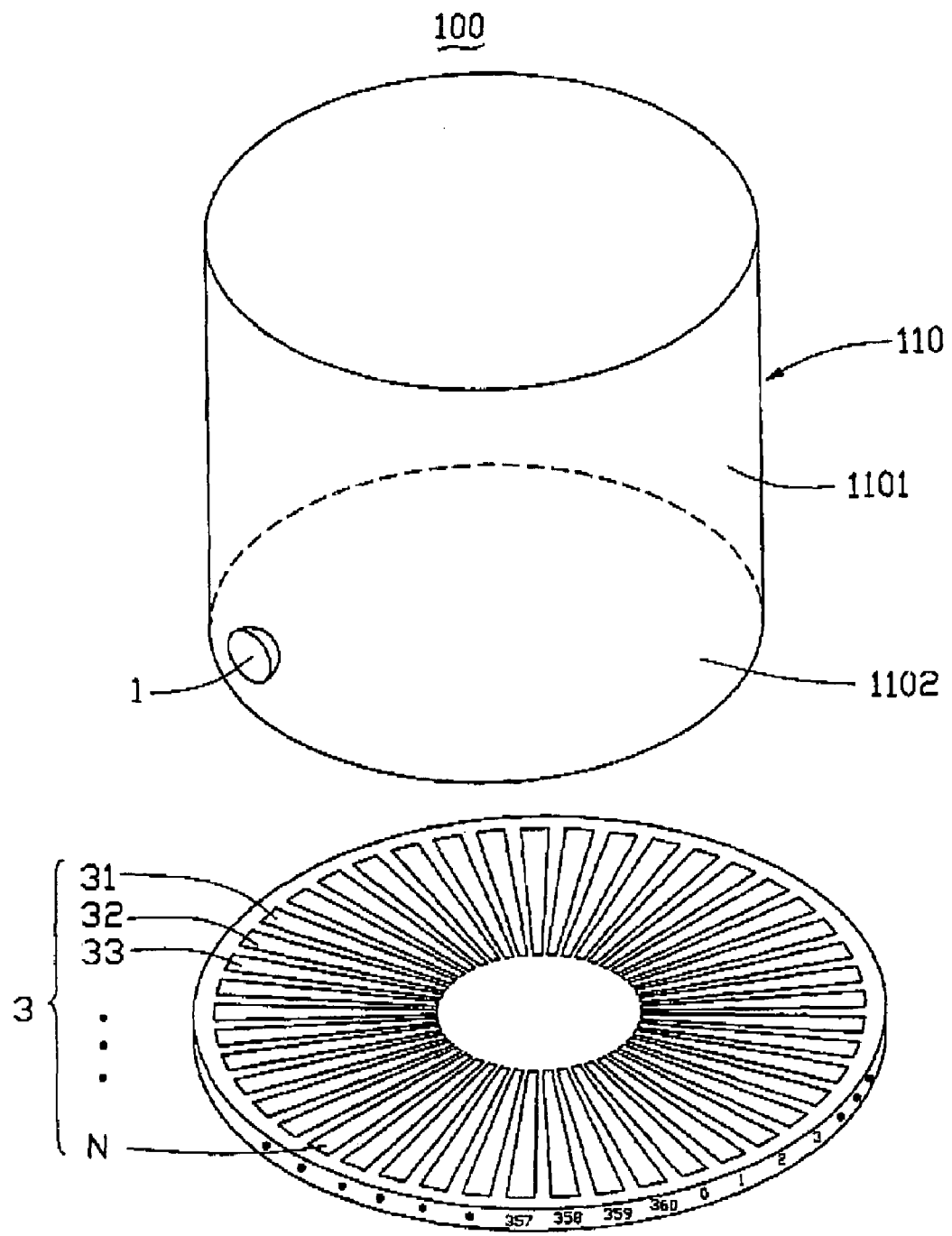
FIG. 4 is a schematic, isometric view of apparatus for detecting rotational angle of the rotational element, in accordance with a fourth embodiment of the present invention.

The light emitting element 1 is disposed at the end surface 1102 of the rotational element 110 so as to rotate together with the rotational element 110 and emits light in a direction substantially parallel to a rotational axis of the rotational element 110. The light emitting element 1 can also be disposed at the circumferential surface 1101 of the rotational element 110 (as shown in FIG. 4).

The image detecting element 3 is disposed at a position so as to receive the light emitted by the light emitting element 1, for example, at a mounting stage facing the end surface 1102 and perpendicular to the rotational axis of the rotational element 110. The image detecting element 3 is an image sensor including a plurality of reception zones 31, 32, 33 ... N evenly arranged along a circumference thereof. Each of the reception zones 31, 32, 33 ... N has definite position in the image sensor and is labeled with a zone number at a fringe of each reception zone. The zone number corresponds to an angular section of an angular range between two angles, for example between from 0 and 360. The image sensor may be a charge coupled device (CCD), or a complementary metal-oxide semiconductor (CMOS). In this embodiment, the image sensor is annular in shape. Alternatively, the image sensor can also be a square sensor. Each of the reception zones 31, 32, 33 ... N could be a single pixel cell or a zone of pixel cells. Each of the reception zones 31, 32, 33 ... N is an annular sector in shape.

In use, when the rotational element 110 is rotated to a certain position and stops in that position, the light emitted from the light emitting element 1 is received by one of reception zones 31, 32, 33 ... N positioned corresponding to the light emitting element and such reception zone can be thus be illuminated when receiving the light. Because the reception zone receiving the light has a definite position and is labeled with a zone number corresponding to its angular section, the rotational angle or position of the rotational element 110 can be detected by identifying the zone number. Therefore, the apparatus 10 experiences no time-lapse and can still achieve a high accuracy and efficiency.

Figure 1:
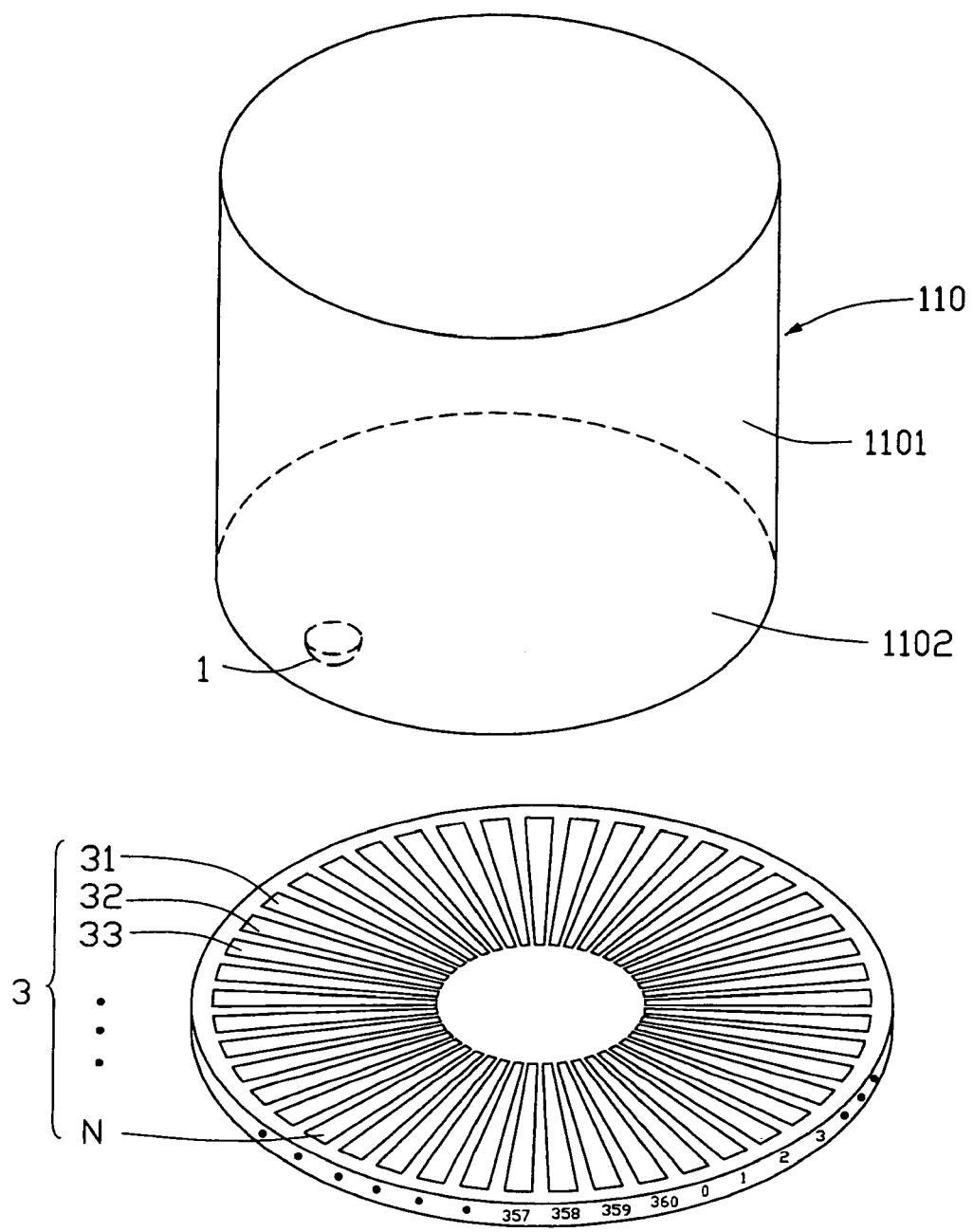
FIG. 1 is a schematic, isometric view of apparatus for detecting rotational angle of a rotational element in accordance with a first embodiment of the present invention.
Figure 2:
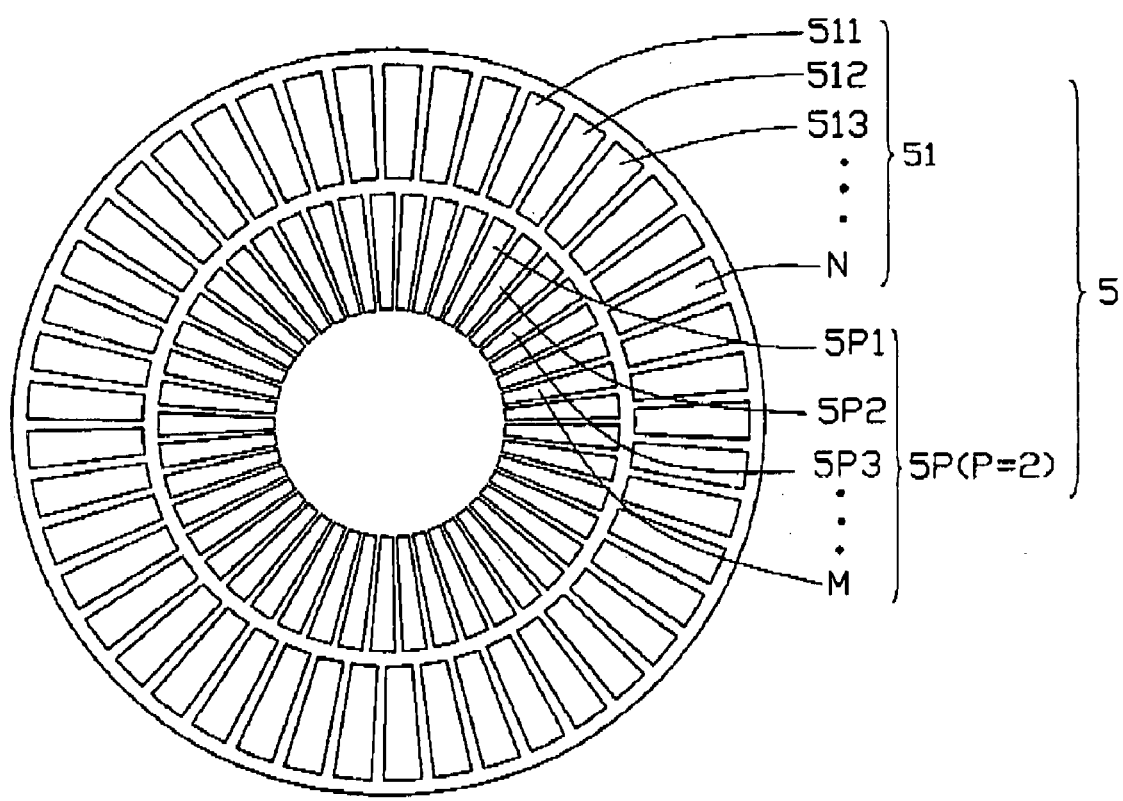
FIG. 2 is a schematic, isometric view of an image detecting element, in accordance with a second embodiment of the present invention.

The image detecting element 3 can include a plurality of annular portions arrayed in the same axis, for example if the number of the annular portions is P (where P>2), and the reception zone P and the reception zone P-1 are spaced from each other by a distance of size 1/P reception zone. Referring to FIG. 2, in a second embodiment, an apparatus is substantially the same as the apparatus 100 in the first embodiment.

The main differences being that the image detecting element 5 in the second embodiment includes a first annular portion 51 and a second annular portion 52 (5P, P=2) disposed in the same axis. The first annular portion 51 includes a plurality of reception zones 511, 512, 513 . . . N arranged with proportional spacing, and the second annular portion 52 also includes a plurality of reception zones 521 (5P1, P=2), 522 (5P2, P=2), 523 (5P3, P=2) . . . M evenly arrayed along a circumference thereof. The reception zone N and the reception zone M are spaced from each other by a distance of a size of half a reception zone. If the first annular portion 51 receives the light, the image detecting element 5 will display a number of rotational degrees such as 1, 2, 3 . . . 360. If the second annular portion 52 receives the light, the image detecting element 5 will display a number of rotational degrees such as 0.5, 1.5, 2.5 . . . 355.5. Therefore, the apparatus in the second preferred embodiment can achieve a higher accuracy.

Figure 3:
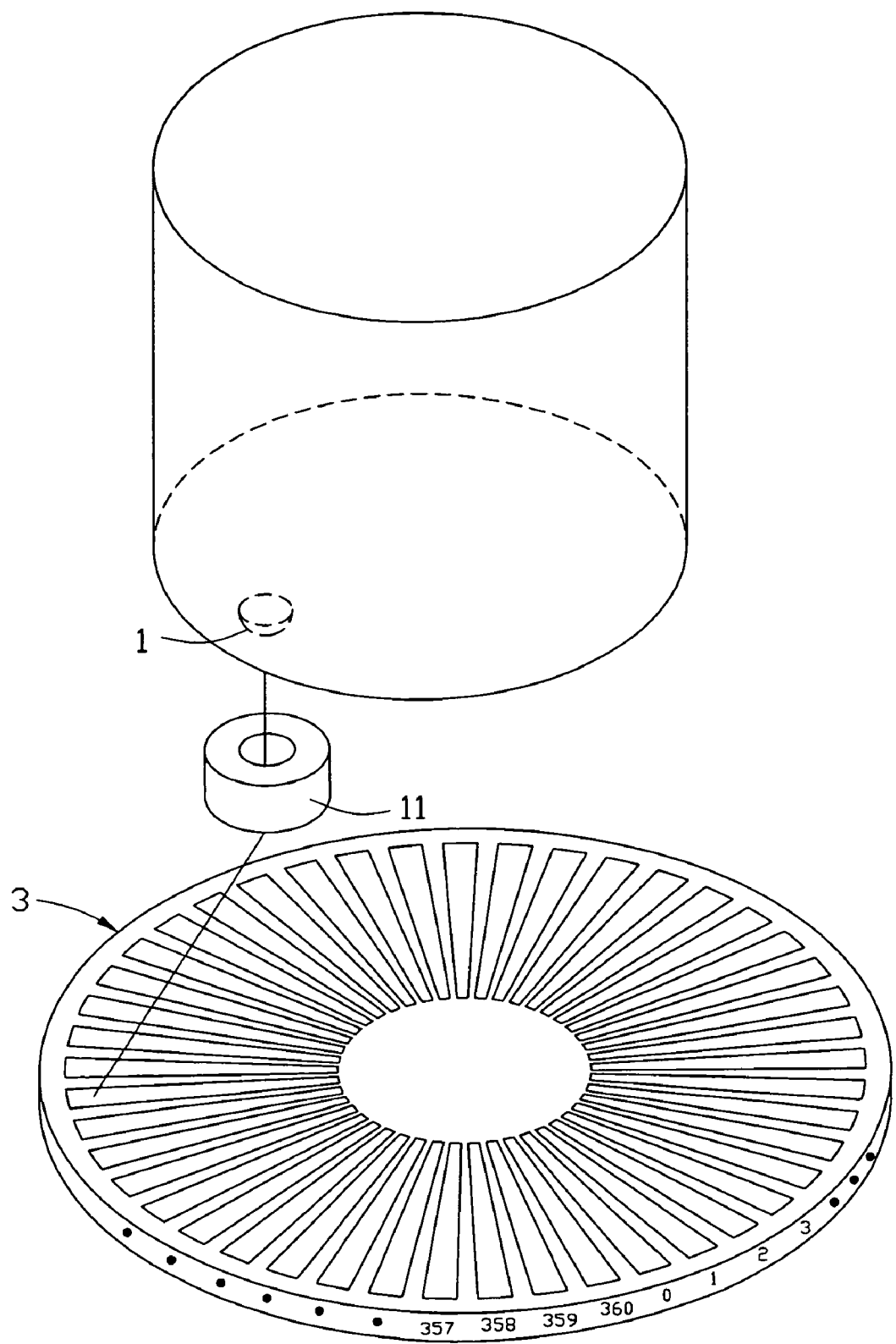
FIG. 3 is a schematic, isometric view of apparatus for detecting rotational angle of the rotational element in accordance with a third embodiment of the present invention.

Referring FIG. 3, in a third embodiment, an apparatus is substantially the same as the apparatus 100 in the first embodiment. The difference being that the apparatus in the third preferred embodiment has a light deflection element 11 for deflecting the light emitting from the light emitting element 1 to the image detecting element 3. The deflection element 11 can be an optical prism or a reflector. A fringe (not labeled) of the image detecting element 3 has a largest circumference, thus, each reception zone can easily identify the rotational degree of the rotational element 110, therefore, the accuracy of the apparatus in the third preferred embodiment can be increased.

In the above-described embodiments, different reception zones are illuminated when receiving light from different angular sections of the rotational element, thereby establishing a plurality of distinct illumination status of the whole image detecting element. By identifying these distinct illumination statuses, the rotational angle of the rotational element can be obtained.

It is believed that the embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

I claim:

1. An apparatus for detecting rotational angle of a rotational element, comprising:
   a light emitting element configured for being disposed on the rotational element for emitting light, and
   an image detecting element having a plurality of reception zones for receiving the light emitted from the light emitting element, wherein said image detecting element comprises an image sensor, wherein each of the reception zones is an annular sector in shape and an annular sector of said image sensor, each of the reception zones being labeled with one respective zone number, each reception zone corresponding to one respective rotational position of the rotational element as the rotational element rotates, wherein the rotational position of the rotational element can be obtained by identifying the respective zone number of the corresponding reception zone.

2. The apparatus as claimed in claim 1, wherein the rotational element includes a circumferential surface and an end surface.

3. The apparatus as claimed in claim 2, wherein the light emitting element is disposed at the end surface so as to rotate together with the rotational element.

4. The apparatus as claimed in claim 2, wherein the light emitting element is disposed at circumferential surface so as to rotate together with the rotational element.

5. The apparatus as claimed in claim 2, wherein the light emitted by the light emitting element is substantially parallel to a rotational axis of the rotational element.

6. The apparatus as claimed in claim 5, wherein the image detecting element is disposed at a position facing the end surface and perpendicular to the rotational axis of the rotational element.

7. The apparatus as claimed in claim 5, wherein the image detecting element is annular in shape and the reception zones are evenly arranged along a circumference thereof.

8. The apparatus as claimed in claim 1, wherein the image detecting element includes a plurality of annular portions including a first annular portion and a second annular portion adjacent to the first annular portion, the annular portions being disposed in the same axis.

9. The apparatus as claimed in claim 8, wherein the first annular portion has a plurality of reception zones arranged in proportional spacing, and the second annular portion also has a plurality of reception zones arranged with proportional spacing, and one reception zone of the first annular portion and one reception zone of the second annular portion adjacent to reception zone of the first annular portion are spaced from each other by a distance of size 1/P reception zone, wherein P is the number of annular portions.

10. The apparatus as claimed in claim 1, wherein the apparatus farther comprises a light deflection element configured for deflecting the light to the image detecting element.

11. The apparatus as claimed in claim 10, wherein the light deflection element is one of an optical prism and a reflector.

12. The apparatus as claimed in claim 1, wherein each of the reception zones is labeled with one respective zone number at a fringe thereof.

13. The apparatus as claimed in claim 1, wherein the image sensor is one of a CCD sensor and CMOS sensor.

14. An apparatus for detecting rotational angle of a rotational element, comprising:
   a light emitting element configured for emitting light from the rotational element; and
   an image detecting element configured for receiving the light so that the image detecting element is illuminated, the image detecting element having a plurality of distinct illumination statuses and a plurality of reception zones corresponding to a plurality of zone numbers, wherein said image detecting element comprises an image sensor, wherein each of the reception zones is an annular sector in shape and an annular sector of said image sensor, the plurality of distinct illumination statuses further corresponding to the light emitted from the light emitting element as the rotational element rotates at a plurality of rotational angles, wherein the rotational angle of the rotational dement is able to be obtained by identifying the respective illumination status and the corresponding zone number.

15. The apparatus of claim 14, wherein the distinct illumination statuses includes illumination of different reception zones.

16. The apparatus of claim 15, wherein the reception zones are arranged along a circumference of the image detecting element.

17. The apparatus of claim 14, wherein the range detecting element is one of a CCD and a CMOS.

18. A method for detecting rotational angle of a rotational element, the rotational element including a light emitting element, the method comprising steps of:

rotating the rotational element combined with the light emitting element;

emitting a light from the rotational element; receiving the light with an image detecting element having a plurality of reception zones so that one of the reception zones is illuminated, wherein said image detecting element comprises an image sensor, wherein each of the reception zones is an annular sector in shape and an annular sector of said image sensor, the plurality of reception zones respectively corresponding to a plurality of rotational angles of the rotational element, the plurality of reception zones respectively corresponding to a plurality of zone numbers; and identifying the respective illuminated reception zone and the respective zone number of the respective illuminated reception zone, wherein the respective rotational angle of the rotational element is obtained.

* * * * *